United States Patent [19]

Finlan

[11] Patent Number: 5,025,972
[45] Date of Patent: Jun. 25, 1991

[54] APPARATUS FOR PATCHING A HOLE IN THE HULL OF A MOVING SHIP

[76] Inventor: William P. Finlan, 5130 Baldwin Avenue, Temple City, Calif. 91780

[21] Appl. No.: 475,848

[22] Filed: Feb. 6, 1990

[51] Int. Cl.⁵ .................... B23K 37/02; B23K 37/04
[52] U.S. Cl. ........................... 228/32; 228/44.3; 228/45; 228/119; 228/4.1; 29/402.09; 29/402.16; 114/227; 114/221 A
[58] Field of Search ............... 228/119, 212, 4.1, 32, 228/44.3, 45, 47, 49.1; 29/402.09, 402.14–402.17; 114/221 A, 224, 227

[56] References Cited

U.S. PATENT DOCUMENTS

| | | | |
|---|---|---|---|
| 4,216,893 | 8/1980 | Glatthorn | 228/119 |
| 4,526,311 | 7/1985 | Schröder | 228/119 |
| 4,729,503 | 3/1988 | Niinivaara | 228/241 |
| 4,740,257 | 4/1988 | Halls et al. | 29/402.09 |
| 4,762,266 | 8/1988 | Schröder et al. | 228/119 |
| 4,821,665 | 4/1989 | Matthias et al. | 114/221 A |

FOREIGN PATENT DOCUMENTS

| | | | |
|---|---|---|---|
| 2475184 | 8/1981 | France | 228/119 |
| 193790 | 10/1985 | Japan | 114/221 A |
| 679361 | 8/1979 | U.S.S.R. | 228/119 |

*Primary Examiner*—Sam Heinrich
*Attorney, Agent, or Firm*—Christie, Parker & Hale

[57] ABSTRACT

Apparatus for remotely placing and welding a patch over an underwater breach in the hull of a ship. The apparatus is lowered into position over the side of the ship by a winch and cable, then held against the ship's hull by electromagnets. The apparatus has a generally streamlined frame containing a chamber within which a patch plate is carried. Wheels are disposed on the frame to permit the frame to be driven along the hull and positioned over the breach. The patch plate is then moved into position against the hull and welded into place. Operation of the apparatus is viewed through video cameras and is remotely controlled by an operator on board the ship.

12 Claims, 3 Drawing Sheets

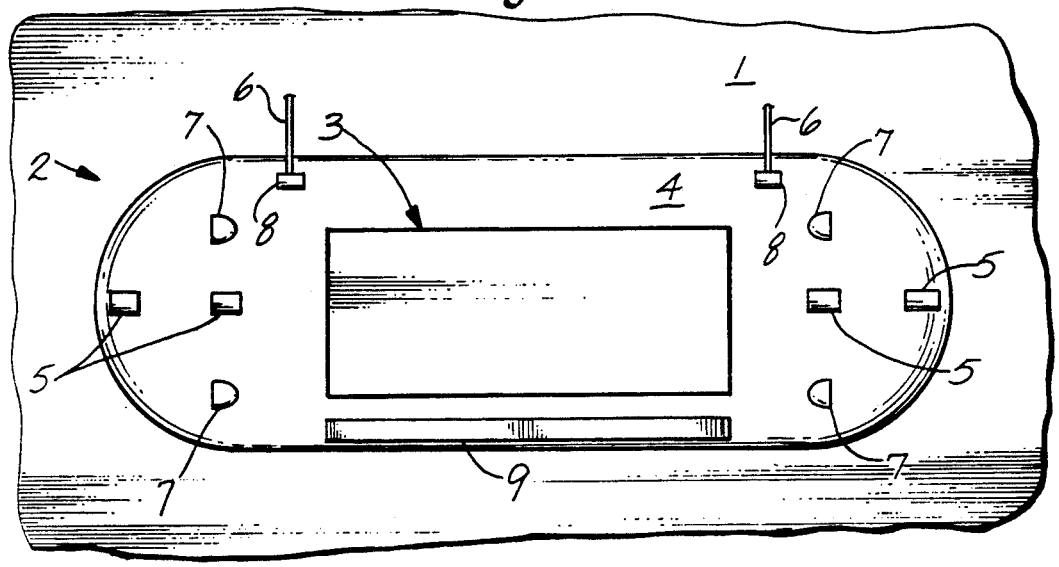
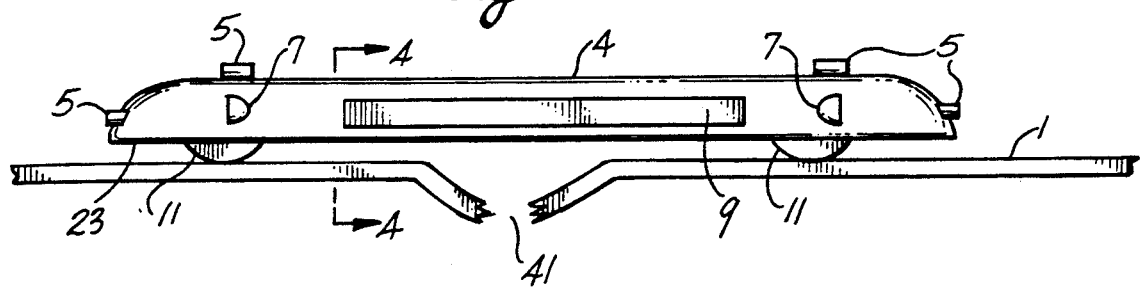

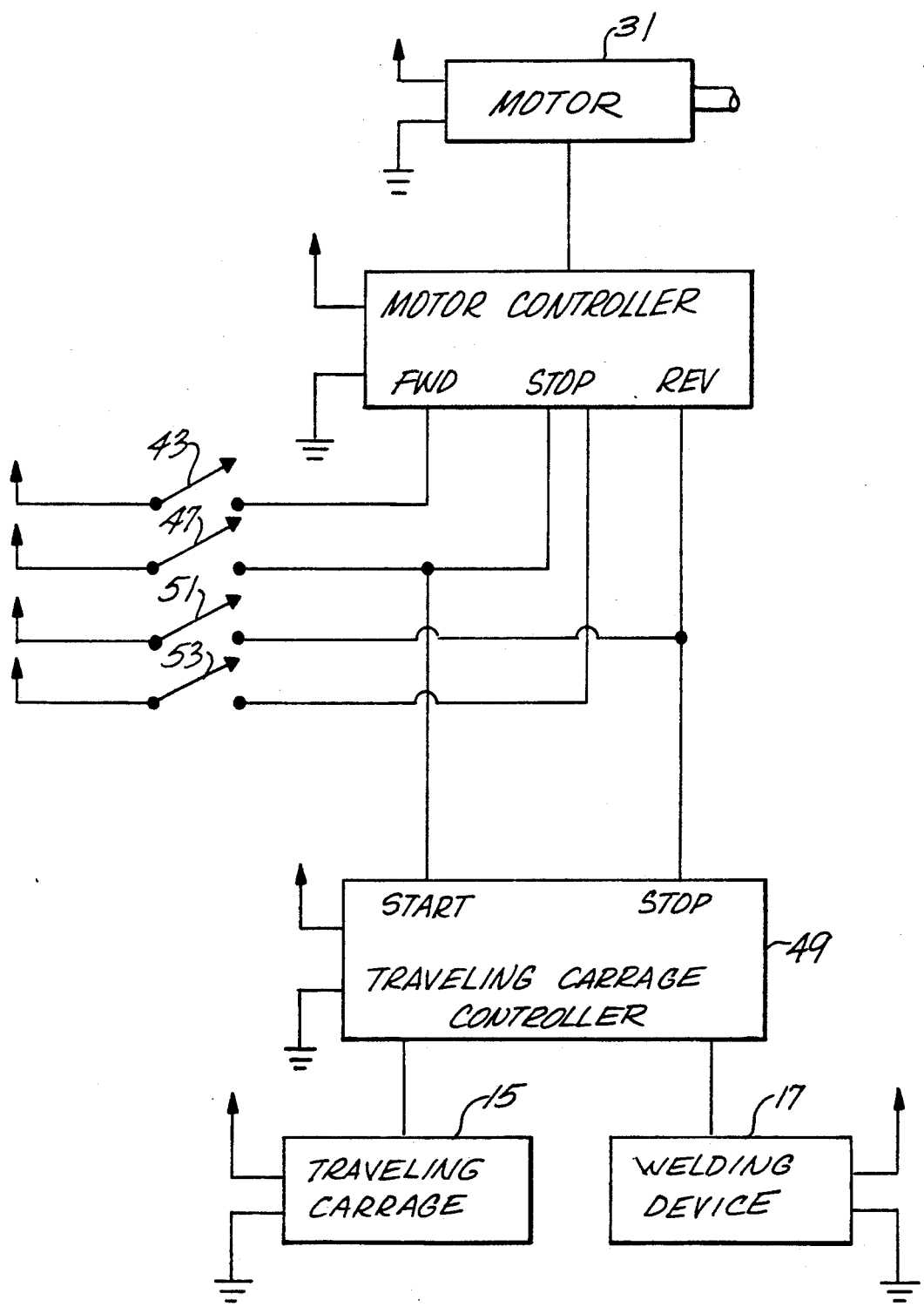

APPARATUS FOR PATCHING A HOLE IN THE HULL OF A MOVING SHIP

FIELD OF THE INVENTION

The present invention relates generally to the field of maritime damage control and particularly to the repair, by remote control, of a breach in the hull of a moving ship.

BACKGROUND OF THE INVENTION

When a sip at sea suffers a collision resulting in a penetration of its hull below the waterline, repairs must normally be made before the ship's voyage may be continued. The continued safety of the vessel is often dependent on stopping the inflow of water resulting from the breach.

While the ship's pumps are used to lessen the effects of flooding, temporary repairs to stop or reduce the leakage can sometimes be made from within the vessel. However, more permanent external repairs are preferred because they offer better structural integrity for the ship than do internal repairs.

The most common form of temporary external repair is effected by welding a steel patch over the breach on the outside of the hull. This type of repair is preferred because the hydrostatic pressure of water against the patch causes little or no additional stress on the welds holding the external patch in place.

Two problems are associated with external repairs made below a ship's waterline. First, the ship must be stopped to permit the repair to be made. This delays the ship's arrival at its port of destination. Second, wave action combined with the ship's rolling motions makes the task of positioning and welding a patch to the hull of a ship, underwater very hazardous to the divers making the repairs. As a result, nearly no external repairs to underwater hull penetrations are currently made on commercial vessels while afloat. Those repairs that are effected are done with great care, considerable danger, are very temporary and generally take a long time. In lieu of such repairs, the ship is normally taken to the nearest available dry dock under its own power, or under tow if necessary, where the needed repairs are carried out.

At any given time, only a small number of available dry docks of the necessary size are normally available. This results in long detours from the ship's planned route to and from the dry dock. The time required for such transit plus the time needed for repairs can result in the ship being out of service for a considerable period. As a result, collision repair is extremely costly to the operation of a vessel. A need therefore exists for a safe means of repairing a ship at sea. If a sufficiently sound patch could be safely placed and welded over an underwater penetration of a ship's hull, the ship would then be able to continue its planned itinerary and obtain permanent repairs in dry dock when and where available.

SUMMARY OF THE INVENTION

The present invention addresses this need. It achieves the needed repairs in an effective, efficient and safe manner.

The invention provides an apparatus for remotely placing and welding a patch over an underwater breach in the hull of a ship. The repairs to the ship may be made while the ship is underway at reasonable speed without danger to the crew.

Generally speaking and according to a presently preferred embodiment, the invention comprises a streamlined frame having a working surface cooperable with the surface of the hull. It is desirable to streamline the frame to reduce the effect of wave action and drag on the apparatus when it is positioned underwater on the side of the ship. This reduces the tendency of the water to displace the frame from its desired location. The frame is initially lowered over the side of the ship and placed adjacent to the hull area to be patched. A winch and cable may be used for this positioning of the frame. The working surface of the frame defines a chamber which is sized and configured for the receipt of a metallic patch plate having a selected area and shape suitable for repair of the breach. The plate is held is place in the frame chamber substantially parallel to the working surface of the frame. In another embodiment, multiple plates may be loaded and held in the frame chamber to facilitate the repair of larger hull penetrations.

Electromagnets on the frame hold the frame to the side of the hull. Suitable means, such as a plurality of wheels or continuous roller treads, are disposed on the frame to permit the frame to be driven along the hull and positioned over the breach while held to the hull by the electromagnets. Means are disposed on the frame for placing and holding the patch plate on the hull over the breach. Additional means are disposed on the frame for welding the patch plate to the hull.

Optical viewing means such as one or more video cameras are disposed on the frame and a monitor is placed at a remote location for viewing the operation of the apparatus. Means are additionally provided for remotely controlling the entire operation of the apparatus.

BRIEF DESCRIPTION OF THE DRAWINGS

The above-mentioned and other features and advantages of this invention are more fully set forth in the following description of a presently preferred embodiment of the invention; which description is presented with reference to the accompanying drawings, wherein:

FIG. 1 is a top plan view of a patching apparatus according to a presently preferred embodiment of the invention;

FIG. 2 is a side elevation view of the apparatus above in FIG. 1;

FIG. 5 is a schematic and block diagram depicting the operative relations of certain of the components of the apparatus above in FIG. 1.

DETAILED DESCRIPTION

Figure 3:
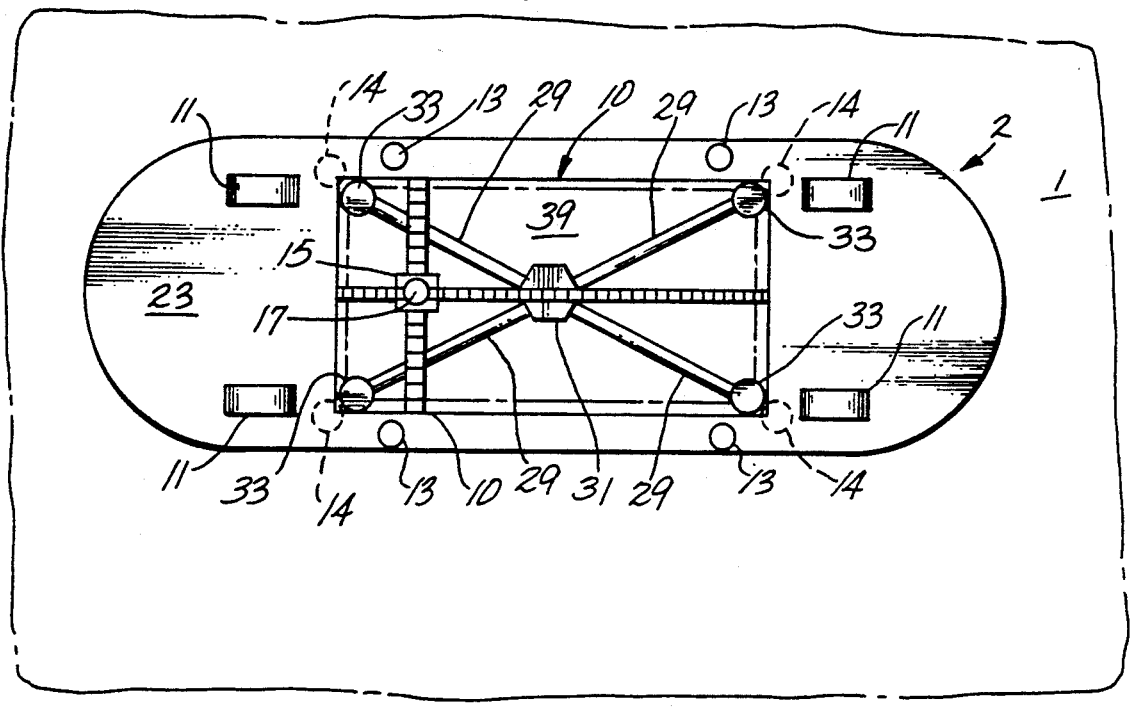
FIG. 3 is a bottom plan view of the apparatus above in FIG. 1.

FIGS. 1—3 show a patching apparatus according to a presently preferred embodiment of the invention in place against the hull of a ship. The apparatus has a frame 2 which may be enclosed by a fairing skin 4 of a generally streamlined shape. The fairing skin 4 protects the apparatus when not in use and facilitates its movement through the water when in use below the waterline of a ship in motion. Located on the upper (outer) skinned surface of the frame 2, as shown in FIG. 1, is a centrally located, generally rectangularly shaped machinery access hatch 3. This hatch 3 permits normal maintenance and repair activities to be conveniently carried out on the apparatus. Two remotely controlled video cameras 5, which may optionally have zoom lenses, are located on the frame 2, preferably along its centerline, between the each end of the frame and the access hatch 3. The cameras allow an operator of the apparatus to precisely position the frame over the hull penetration 41 to be patched from a position on the ship. Two flood lights 7 are mounted near each end of the top surface of the frame 2 to provide light for the operation of the video cameras 5 at night and in poor lighting conditions underwater. Similar video cameras and lights can be located inside the frame 2 for remotely observing operation of the apparatus during the patch placement and welding operations, described below. A loading hatch 9 is located on one side of the frame 2 to permit loading of a patch plate 39 into the patch handling mechanism within the apparatus.

Frame supporting cables 6 are connected to the apparatus at suitably spaced locations 8 along one of the peripheral sides of the frame 2. The cables 6 can be lead to suitable winches (not shown) on the deck of the ship for lowering the apparatus to its initial placement on the hull over or near the place where a repair in the hull is desired, and for retrieving the apparatus onto the ship when the repair has been made. The cables also provide a safety tether on the apparatus as it is used to make a repair, and they can also provide a control umbilical connection from the apparatus to the repair operator station at a suitable place on the ship.

Figure 4:
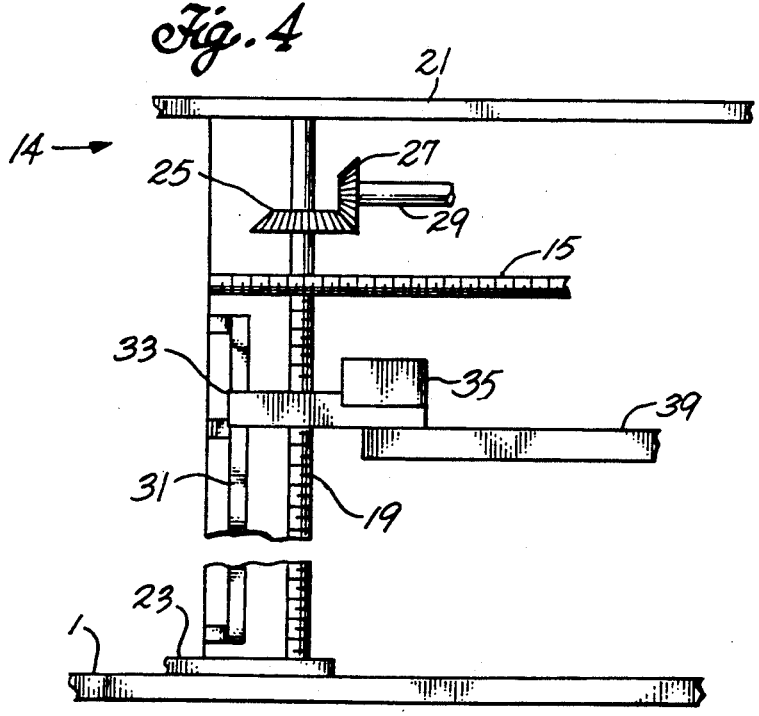
FIG. 4 is a section view taken along line 4—4 of FIG. 2.

Referring now to FIGS. 3 & 4, a generally rectangular chamber 10 is located on the lower side of the frame 2. The patch plate's storage, positioning and welding devices, described below, are located within this chamber. Two driven steerable tires 11 are located between the chamber 10 and each end of the frame 2. The tires 11 may be electrically, hydraulically or pneumatically driven. Other forms of locomotion may also be used, such as continuous roller treads, as required by the surface over which the frame is to be driven and steered. Four electromagnets 13 are located near the corners of the chamber 10, between the chamber and the sides of the frame 2. The electromagnets 13 urge the frame against the hull 1 while the frame is being driven into position over the breach 41. The electromagnets 13 can also be operated to clamp the positioned frame to the hull during the patch placement and welding operations.

A plate holding device 14 is located at each of the four corners within the plate delivery chamber 10. A traveling carriage 15 is located between the plate holding devices 14 and the upper surface 21 of the frame 2. Mounted on the traveling carriage 15 is a welding device 17. The traveling carriage 15 is remotely controllable and capable of moving the welding device 17 laterally and longitudinally within the chamber 10.

The plate holding devices 14 preferably are comprised of threaded shafts 19 journaled in the upper surface 21 and lower surface 23 of the frame 2. Bevel gears 25 are mounted near the ends of threaded shafts 19 near the upper surface 21 of the frame 2. Bevel gears 25 are driven by pinion gears 27. Pinion gears 27 are mounted on driving shafts 29. A remotely controlled motor 31 (see FIG. 5) is mounted centrally within the plate delivery chamber 10 adjacent to the access hatch 3. Motor 31 drives the shafts 29.

Mounted on the threaded shafts 19 are traveling nuts 33. Traveling nuts 33 are constrained from rotating in cooperation with the shafts 19 by slides 34. Mounted on the traveling nuts 33 opposite to the slides are holding electromagnets 35. A patch plate 39 is magnetically held within the plate delivery chamber 10 by the holding electromagnets 35. Operation of the motor 31 causes rotation of the driving shafts 29 which in turn drive gears 27 and 25. Rotation of gears 25 causes rotation of threaded shafts 19. Traveling nuts 33 unable, to rotate in cooperation with shafts 19, move longitudinally along shafts 19 in response to the rotation of the shafts 19. Holding electromagnets 35 mounted on traveling nuts 33 thus move the patch plate 39 from its stowed position within the chamber 10 to its desired position against the hull 1, over a breach 41 in the hull, in preparation for the welding of the plate to the hull.

Patch plate 39 is welded or spot welded into place over the breach 41 by welding device 17 as the welding device is transported around the perimeter of patch plate 39 by traveling carriage 15. Referring now to FIG. 5, motor 31 is remotely started by the operator closing switch 43. This causes the motor controller 45 to begin rotation of the motor 31 in the forward direction. As a result, holding devices 14 begin moving the plate 39 towards the hull 1. Sensing switch 47, located on the frame 2, is engaged when the plate 39 is seated against the hull 1. This causes motor controller 45 to stop motor 31 and causes traveling carriage controller 49 to enable movement of the traveling carriage 15, under control of the operator (or automatically, if desired), around the perimeter of the patch plate 39, and to enable operation of the welding device 17 tack welding or fully welding the patch plate 39 to the hull 1. Switch 51, located in the traveling carriage controller 49, is engaged when the welding of the patch plate 39 has been completed. At an appropriate time during operation of the apparatus, such as after the patch plate has been welded to the hull adequately to stay in place on the hull, holding electromagnets 35 can be de-energized at the direction of the operator of the apparatus. Closure of switch 51 stops the traveling carriage 15 and the welding device 17, and causes the motor controller 45 to move motor 31 in the reverse direction. As a result, the de-energized holding devices 14 begin moving towards their original plate loading and carrying positions. Sensing switch 53, located on the frame 2, is engaged when the holding devices have reached their original positions and causes motor controller 45 to stop motor 31, completing the repair procedure. The frame 2 then may be removed from the side of the ship and returned to its storage position on board the ship.

In other embodiments the invention may be used to repair breaches in tanks and other vessels holding toxic liquids or which are located in hazardous environments. In such situations the material of which the vessel is constructed may require differing methods of welding or bonding the repair patch into place. For example, composite structures may require ultrasonic bonding or the application of adhesives. Additionally, multiplestep welding, bonding and adhering processes may be used. Localized connections may be initially made to tack a patch in place, then a sealant may be applied to the perimeter of the patch to provide a non-leaking patch.

Depending on the environment and the context, a more or less secure patch may be dictated. For example, in the shipboard situation described above, the flooding from the sea may not need to be completely stopped. If leakage is reduced to a tolerable level, the ship's pumps can then be used to control flooding until the ship reaches port. In other situations, such as repair of tanks containing hazardous materials or liquids, it may be critical to both cover the breach and to seal the opening to stop all leakage.

The foregoing descriptions pertain to the presently preferred embodiment and other embodiments of the present invention. One skilled in the art to which the invention pertains will readily recognize from such discussion that various changes, modifications and variations may be made therein without departing from the spirit and scope of the invention as defined in the following claims.

What is claimed is:

1. Apparatus for remotely repairing a breach in the surface of a ferromagnetic structure comprising:
    a metallic patch plate having a selected area and shape;
    a frame having a surface cooperable with the breached surface of the structure and defining a chamber sized and configured for the receipt of the patch therein in a desired positional relation to said surface of the frame;
    means for moving the frame to the surface to be repaired;
    electromagnetic means on the frame in cooperation with the frame surface for holding the frame on the structure;
    means on the frame for driving the frame along the surface to be repaired;
    means on the frame for carrying the patch plate within the chamber and for holding the patch plate on the surface to be repaired over the breach;
    means disposed on the frame for welding the patch plate to the surface to be repaired;
    optical viewing means disposed on the frame for remote viewing of the operation the apparatus;
    means for remotely controlling the operation of the apparatus.

2. The apparatus of claim 1 wherein the optical viewing means includes one or more lights disposed on the frame.

3. The apparatus of claim 1 wherein the structure is a ship and the surface is a submerged surface of the ship's hull.

4. The apparatus of claim 3 wherein the means for moving the frame includes means for moving the frame from a stowed location on the ship to a position approximately over the breach;

5. The apparatus of claim 1 wherein the frame is enclosed having one or more additional surfaces of a generally streamlined shape.

6. The apparatus of claim 1 wherein the means for transporting the frame to the surface to be repaired includes a cable connected to the frame.

7. The apparatus of claim 1 wherein the electromagnetic means disposed on the frame includes a plurality of electromagnets disposed on the surface of the frame cooperable with the surface to be repaired;

8. The apparatus of claim 1 wherein the means for driving the frame along the surface to be repaired are rotating members disposed on the frame.

9. The apparatus of claim 8 wherein the rotating members includes a plurality of wheels drivably mounted on the frame.

10. The apparatus of claim 8 wherein the rotating members includes one or more continuous roller belts drivably mounted on the frame.

11. The apparatus of claim 1 wherein the optical viewing means includes a remotely operated video camera and monitor viewing system.

12. The apparatus of claim 11 wherein the video camera has a zoom lens.

* * * * *